US012488920B2

(12) United States Patent
Dong et al.

(10) Patent No.: US 12,488,920 B2
(45) Date of Patent: Dec. 2, 2025

(54) MAGNETIC ELEMENT

(71) Applicant: Delta Electronics (Shanghai) Co., Ltd., Shanghai (CN)

(72) Inventors: Jianxing Dong, Shanghai (CN); Liang Wang, Shanghai (CN); Teng Liu, Shanghai (CN); Jianping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 19/227,472

(22) Filed: Jun. 4, 2025

(65) Prior Publication Data

US 2025/0292936 A1 Sep. 18, 2025

Related U.S. Application Data

(62) Division of application No. 17/556,661, filed on Dec. 20, 2021, now Pat. No. 12,354,787.

(30) Foreign Application Priority Data

Jan. 18, 2021 (CN) ........................ 202110061302.X

(51) Int. Cl.
*H01F 3/14* (2006.01)
*H01F 27/38* (2006.01)

(52) U.S. Cl.
CPC ............... *H01F 3/14* (2013.01); *H01F 27/38* (2013.01)

(58) Field of Classification Search
CPC .......... H01F 3/14; H01F 27/38; H01F 27/085; H01F 27/2876
USPC ..................................... 336/178, 67, 68, 185
See application file for complete search history.

(56) References Cited

U.S. PATENT DOCUMENTS

| | | | |
|---|---|---|---|
| 2,904,760 | A | 9/1959 | Johnston |
| 2,976,504 | A | 3/1961 | Martin et al. |
| 3,345,595 | A | 10/1967 | Heinz |
| 4,663,604 | A | 5/1987 | VanSchaick et al. |
| 6,147,580 | A | 11/2000 | Rettew et al. |
| 6,160,464 | A | 12/2000 | Clarke et al. |

(Continued)

FOREIGN PATENT DOCUMENTS

| | | | |
|---|---|---|---|
| CN | 101202158 | A | 6/2008 |
| CN | 102360825 | A | 2/2012 |

(Continued)

*Primary Examiner* — Shawki S Ismail

(74) *Attorney, Agent, or Firm* — KIRTON McCONKIE; Evan R. Witt

(57) ABSTRACT

A magnetic element includes at least one first air gap. A first portion of the first air gap is arranged between the first projection line and the second projection line. A second portion of the first air gap is beyond the region between the third projection line and the fourth projection line. Due to the air gap, the dielectric constant between the first end part of the winding and the magnetic leg and the dielectric constant between the second end part of the winding and the magnetic leg are reduced. Moreover, the electric field distribution of the first end part and the second end part will be more uniform, and the partial discharge extinction voltage will be increased. The volume and the cost of the magnetic element are both reduced. In addition, the equalizing rings are not required. Consequently, the fabricating process of the magnetic element is simplified.

11 Claims, 9 Drawing Sheets

(56) References Cited

U.S. PATENT DOCUMENTS

| | | | | |
|---|---|---|---|---|
| 7,808,355 | B2 * | 10/2010 | Nagano | H02M 3/1584 336/212 |
| 8,933,772 | B2 * | 1/2015 | Suzuki | H01F 27/263 336/212 |
| 9,478,347 | B2 | 10/2016 | Sarver et al. | |
| 2001/0052835 | A1 | 12/2001 | Ito et al. | |
| 2007/0279177 | A1 | 12/2007 | Sarver et al. | |
| 2017/0345554 | A1 * | 11/2017 | Waeckerle | H01F 27/26 |
| 2021/0287849 | A1 * | 9/2021 | Kawaguchi | H02M 3/33569 |

FOREIGN PATENT DOCUMENTS

| | | | | | |
|---|---|---|---|---|---|
| CN | 203882785 | U | | 10/2014 | |
| CN | 105679489 | A | * | 6/2016 | H01F 27/346 |
| CN | 103779043 | B | | 9/2017 | |
| CN | 207558546 | U | | 6/2018 | |
| CN | 109494060 | A | | 3/2019 | |
| CN | 209947623 | U | | 1/2020 | |
| CN | 211016701 | U | | 7/2020 | |
| CN | 220065393 | U | * | 11/2023 | |
| DE | 2032507 | A1 | | 1/1972 | |
| EP | 2549495 | A1 | | 1/2013 | |

* cited by examiner

1b

1c

1g

MAGNETIC ELEMENT

CROSS-REFERENCE TO RELATED APPLICATION

This application is a Divisional Application of U.S. patent application Ser. No. 17/556,661 filed on Dec. 20, 2021 and entitled "MAGNETIC ELEMENT", which claims priority to China Patent Application No. 202110061302.X, filed on Jan. 18, 2021, the entire contents of which are incorporated herein by reference for all purposes.

FIELD OF THE INVENTION

The present disclosure relates to a magnetic element, and more particularly to a magnetic element with uniform electric field distribution at the end part of the winding, increased partial discharge extinction voltage, reduced volume, reduced fabricating cost and simplified assembly.

BACKGROUND OF THE INVENTION

Nowadays, the existing magnetic elements such as dry-type reactors or transformers have many advantages. For example, it is not necessary to make a mold in the production process of the dry-type reactor or the transformer. In addition, the dry-type reactor or the transformer has flexible design, strong overload capability, short production cycle and low cost. Consequently, the dry-type reactor or transformer has been widely used.

Generally, the conventional dry-type reactor or transformer includes a magnetic core, a winding and a plurality of support strips. The winding is wound around the magnetic core. The support strips are arranged between the magnetic core and the winding. In addition, the support strips are disposed on the magnetic core to support the winding. The length of each support strip in parallel with the axial direction of the magnetic core is greater than the length between the two endpoints of the winding in parallel with the axial direction of the magnetic core. Moreover, there is no air gaps between the endpoints of the winding and the magnetic core along the radial direction of the magnetic core. Moreover, the winding is not shielded, and the endpoints of the winding are exposed to the air. Since the air breakdown field is low and the electric field strength of the endpoints of the winding is high, the endpoints of the winding are prone to partial discharges. The insulating materials covering the winding or the insulating layers in contact with the winding are readily cracked or even subjected to breakdown. Consequently, accidents possibly occur.

In order to solve the partial discharge problem at the endpoints of the winding, the structures of the conventional dry-type reactors or transformers need to be further improved. For example, the following three methods were used to increase the partial discharge extinction voltage to solve the partial discharge problem. In accordance with the first method, the thickness of the support strip is increased, so that the distance between the winding and the magnetic core is increased. However, this method increases the volume, cost, and power density of the dry-type reactor or transformer. In accordance with a second method, a support strip with a low permittivity constant is used. The support strip with the low permittivity constant can made be of polytetrafluoroethylene or polypropylene. However, the cost of polytetrafluoroethylene is not cost-effective, and the mechanical strength of polypropylene is not strong enough. In other words, no suitable material with low dielectric constant can be adopted. In accordance with a third method, equalizing rings are added to the endpoints of the winding. However, the process of installing and welding the winding becomes more complicated.

For solving the drawbacks of the conventional technologies, the present disclosure provides an improved magnetic element.

SUMMARY OF THE INVENTION

The present disclosure provides a magnetic element with uniform electric field distribution at the end part of a winding, increased partial discharge extinction voltage, reduced volume, reduced fabricating cost and simplified assembly.

In accordance with an aspect of the present disclosure, a magnetic element is provided. The magnetic element includes a magnetic core, at least one support strip assembly, a winding and at least one first air gap. The magnetic core includes a magnetic leg. The at least one support strip assembly is disposed on the magnetic leg. The winding is wound around the at least one support strip assembly, and includes a first end part, a second end part and a first connection part. The first end part and the second end part are respectively connected with two opposite sides of the first connection part. The first end part includes a first endpoint and a second endpoint. The second end part includes a third endpoint and a fourth endpoint. The first endpoint and the second endpoint are connected with each other. The second endpoint is connected with the first connection part. A first projection line is formed between a projection point of the second endpoint on the magnetic leg and the second endpoint. The third endpoint and the fourth endpoint are connected with each other. The fourth endpoint is connected with the first connection part. A second projection line is formed between a projection point of the fourth endpoint on the magnetic leg and the fourth endpoint. A third projection line is formed between a projection point of the first endpoint on the magnetic leg and the first endpoint. A fourth projection line is formed between a projection point of the third endpoint on the magnetic leg and the third endpoint. A connection line between the first endpoint and the third endpoint is the longest distance of the winding in parallel with an axial direction of the magnetic leg. The at least one first air gap is arranged between the magnetic leg and the winding. The at least one first air gap is at least defined by the at least one support strip assembly. A first portion of the at least one first air gap is arranged between the first projection line and the second projection line. A second portion of the at least one first air gap is beyond a region between the third projection line and the fourth projection line through at least one of the third projection line and the fourth projection line.

In accordance with another aspect of the present disclosure, a magnetic element is provided. The magnetic element includes a magnetic core, at least one first support strip assembly, a first winding, at least one second support strip assembly, a second winding and at least one first air gap. The magnetic core includes a magnetic leg. The at least one first support strip assembly is disposed on the magnetic leg. The first winding is wound around the at least one first support strip assembly. The at least one second support strip assembly is disposed on the first winding. The second winding is wound around the at least one second support strip assembly, and includes a first end part, a second end part and a first connection part. The first end part and the second end part are respectively connected with two opposite sides of the first connection part. The first end part includes a first endpoint and a second endpoint. The second end part includes a third endpoint and a fourth endpoint. The first endpoint and the second endpoint are connected with each other. The second endpoint is connected with the first connection part. A first projection line is formed between a projection point of the second endpoint on the magnetic leg and the second endpoint. The third endpoint and the fourth endpoint are connected with each other. The fourth endpoint is connected with the first connection part. A second projection line is formed between a projection point of the fourth endpoint on the magnetic leg and the fourth endpoint. A third projection line is formed between a projection point of the first endpoint on the magnetic leg and the first endpoint. A fourth projection line is formed between a projection point of the third endpoint on the magnetic leg and the third endpoint. A connection line between the first endpoint and the third endpoint is the longest distance of the second winding in parallel with an axial direction of the magnetic leg. The at least one first air gap is arranged between the second winding and the first winding. The at least one first air gap is at least defined by the at least one second support strip assembly. A first portion of the at least one first air gap is arranged between the first projection line and the second projection line. A second portion of the at least one first air gap is beyond a region between the third projection line and the fourth projection line through at least one of the third projection line and the fourth projection line.

From the above descriptions, the magnetic element of the present disclosure includes at least one first air gap. A first portion of the first air gap is arranged between the first projection line and the second projection line. A second portion of the first air gap is beyond the region between the third projection line and the fourth projection line. In other words, there are air gaps between the end parts of the winding and the magnetic leg. Consequently, the dielectric constant between the first end part of the winding and the magnetic leg and the dielectric constant between the second end part of the winding and the magnetic leg are reduced. Moreover, the electric field distribution of the first end part and the second end part will be more uniform, and the partial discharge extinction voltage will be increased. In other words, the partial discharge problem is solved. The volume and the cost of the magnetic element are both reduced. In addition, the equalizing rings are not required. Consequently, the fabricating process of the magnetic element of the present disclosure is simplified.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
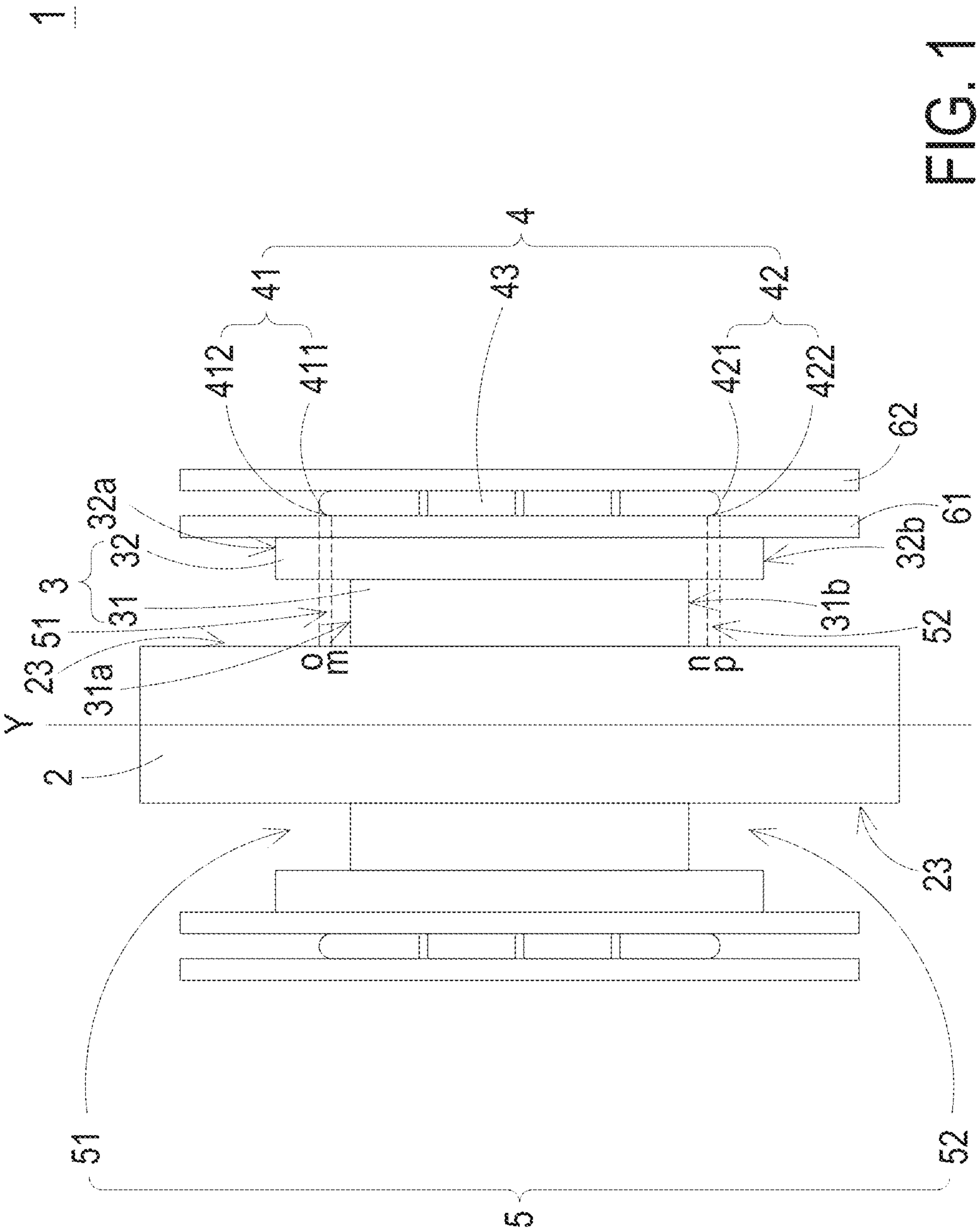
FIG. 1 is a schematic cross-sectional view illustrating the structure of a magnetic element according to a first embodiment of the present disclosure.

Please refer to FIG. 1. FIG. 1 is a schematic cross-sectional view illustrating the structure of a magnetic element according to a first embodiment of the present disclosure. The magnetic element 1 of this embodiment is suitably applied to a dry-type reactor or a transformer. The magnetic element 1 includes a magnetic core, at least one support strip assembly 3, a winding 4, at least one first air gap 5, a first insulation layer 61 and a second insulation layer 62.

For example, the magnetic core is an EI core, a UI core, an EE core or a UU core. The magnetic core includes at least one magnetic leg 2. Preferably but not exclusively, the magnetic leg 2 has a shape of a cuboid. The magnetic leg 2 has a plurality of lateral walls 23. The lateral walls 23 are formed on outer surfaces of the magnetic leg 2 and arranged around an axial direction Y of the magnetic leg 2.

The support strip assembly 3 is used for installing and supporting the winding 4. In an embodiment, the at least one support strip assembly 3 includes a plurality of support strip assemblies 3. The plurality of support strip assemblies 3 are disposed on and arranged around the corresponding lateral walls 23 of the magnetic leg 2, respectively. In another embodiment, the at least one support strip assembly 3 is a single support strip assembly 3 that is disposed on and arranged around the lateral walls 23 of the magnetic leg 2. In an embodiment, the magnetic leg 2 has the shape of a cuboid, the magnetic leg 2 has four lateral walls 23, and the magnetic element 1 includes at least two support strip assemblies 3. The at least two support strip assemblies 3 are disposed on and arranged around the corresponding lateral walls 23 of the magnetic leg 2 or the corresponding edges of the magnetic leg 2. In this embodiment, the magnetic leg 2 has the shape of a cuboid, and the magnetic leg 2 has four lateral walls 23. The magnetic element 1 includes four support strip assemblies 3. The four support strip assemblies 3 are disposed on and arranged around the four lateral walls 23 of the magnetic leg 2 or the four edges of the magnetic leg 2. For succinctness, only two of the four support strip assemblies 3 in the symmetric arrangement are shown in FIG. 1. It is noted that the shape of the magnetic leg 2 is not restricted. For example, in another embodiment, the magnetic leg 2 has a shape of a cylinder and the magnetic leg 2 has a lateral wall 23. Moreover, the magnetic element 1 includes more than two support strip assemblies 3, and the support strip assemblies 3 are disposed on and arranged around the lateral walls 23 of the magnetic leg 2.

In this embodiment, the winding 4 includes a first end part 41, a second end part 42 and a first connection part 43. The first connection part 43 includes a top side, a bottom side, an outer periphery side, and an inner periphery side. The first end part 41 and the second end part 42 of the winding 4 are connected with the top side and the bottom side of the first connection part 43, respectively. The first insulation layer 61 is disposed on the inner periphery side of the winding 4. However, the first insulation layer 61 is not in contact with the first end part 41 and the second end part 42 of the winding 4. Moreover, at least a portion of the inner periphery side of the first connection part 43 is attached on the first insulation layer 61. The first end part 41 includes a first endpoint 411 and a second endpoint 412. The first endpoint 411 is the farthest point of the first end part 41 away from the top side of the first connection part 43. The first endpoint 411 and the second endpoint 412 are connected with each other. The connection line between the first endpoint 411 and the second endpoint 412 is an inclined line or a curved line. Due to the incline line or the curved line, the first end part 41 has a chamfer. The second endpoint 412 is connected with the top side of the first connection part 43. A first projection line m is formed between the projection point of the second endpoint 412 on the magnetic leg 2 and the second endpoint 412.

The second end part 42 includes a third endpoint 421 and a fourth endpoint 422. The third endpoint 421 is the farthest point away from the bottom side of the first connection part 43. The third endpoint 421 and the fourth endpoint 422 are connected with each other. The connection line between the third endpoint 421 and the fourth endpoint 422 is an inclined line or a curved line. Due to the incline line or the curved line, the second end part 42 has a chamfer. The fourth endpoint 422 is connected with the bottom side of the first connection part 43. A second projection line n is formed between the projection point of the fourth endpoint 422 on the magnetic leg 2 and the fourth endpoint 422.

In some embodiments, the chamfers of the first end part 41 and the second end part 42 have triangular shapes, trapezoidal shapes, semi-circular shapes or fan shapes.

The connection line between the first endpoint 411 of the first end part 41 and the third endpoint 421 of the second end part 42 is the longest distance of the winding 4 in parallel with the axial direction Y of the magnetic leg 2. A third projection line o is formed between the projection point of the first endpoint 411 on the magnetic leg 2 and the first endpoint 411. A fourth projection line p is formed between the projection point of the third endpoint 421 on the magnetic leg 2 and the third endpoint 421. The vertical distance between the third projection line o and the fourth projection line p is greater than the vertical distance between the first projection line m and the second projection line n. In this context, the direction of the vertical distance is in parallel with the axial direction Y of the magnetic leg 2.

The second insulation layer 62 is disposed on and arranged around the outer periphery side of the first connection part 43 of the winding 4. The second insulation layer 62 is used for isolating the winding 4 from the external component. The first end part 41 and the second end part 42 of the winding 4 are not in contact with the second insulation layer 62. The outer periphery side of the first connection part 43 of the winding 4 are at least partially attached on the second insulation layer 62.

Preferably but not exclusively, the first insulation layer 61 and the second insulation layer 62 are NOMEX papers or composite insulation papers. It is noted that the installation examples of the first insulation layer 61 and the second insulation layer 62 may be varied according to the practical requirements. For example, in an embodiment, the first insulation layer 61 is disposed on the inner periphery side of the first connection part 43 of the winding 4 and/or the second insulation layer 62 is disposed on the outer periphery side of the first connection part 43 of the winding 4. Alternatively, the first insulation layer 61 is not disposed on the inner periphery side of the first connection part 43 of the winding 4 and/or the second insulation layer 62 is not disposed on the outer periphery side of the first connection part 43 of the winding 4. That is, the winding 4 is directly disposed on and arranged around the support strip assembly 3.

The number of the first air gaps 5 and the number of the support strip assemblies 3 are equal. In addition, the locations of the first air gaps 5 correspond to the locations of the support strip assemblies 3. For example, in this embodiment, the magnetic element 1 includes four support strip assemblies 3 and four first air gaps 5. For succinctness, only two support strip assemblies 3 and two first air gaps 5 corresponding to the two support strip assemblies 3 are shown in the drawing. Each first air gap 5 is at least defined by the adjacent support strip assembly 3. In addition, each first air gap 5 is arranged between the winding 4 and the magnetic leg 2. A first portion of the first air gap 5 is arranged between the first projection line m and the second projection line n. A second portion of the first air gap 5 is beyond the region between the third projection line o and the fourth projection line p through at least one of the third projection line o and the fourth projection line p.

As mentioned above, the magnetic element 1 includes at least one first air gap 5. A first portion of the first air gap 5 is arranged between the first projection line m and the second projection line n. A second portion of the first air gap 5 is beyond the region between the third projection line o and the fourth projection line p through at least one of the third projection line o and the fourth projection line p. In other words, there are air gaps between the winding 4 and the magnetic leg 2 along the radial direction of the magnetic leg 2. In comparison with the conventional magnetic element without the air gaps, the dielectric constant at the end parts of the winding 4 is largely reduced. Since the dielectric constant between the first end part 41 of the winding 4 and the magnetic leg 2 and the dielectric constant between the second end part 42 of the winding 4 and the magnetic leg 2 are reduced, the electric field distribution of the first end part 41 and the second end part 42 will be more uniform and the partial discharge extinction voltage will be increased. In other words, the partial discharge problem is solved. The volume and the cost of the magnetic element 1 are both reduced. In addition, the equalizing rings are not required. Consequently, the fabricating process of the magnetic element 1 of the present disclosure is simplified.

Please refer to FIG. 1 again. Each first air gap 5 includes a first upper air gap part 51 and a first lower air gap part 52. The first upper air gap part 51 is closer to the first end part 41 of the winding 4 than the first lower air gap part 52. The first lower air gap part 52 is closer to the second end part 42 of the winding 4 than the first upper air gap part 51. In this embodiment, each support strip assembly of the magnetic element 1 includes the first support strip 31 and the second support strip 32. The cross section of the first support strip 31 and/or the second support strip 32 along the radial direction of the magnetic leg 2 is not restricted as long as the air gap can be defined by the first support strip 31, the second support strip 32 and the magnetic leg 2 collaboratively. Preferably but not exclusively, the cross section of the first support strip 31 and/or the second support strip 32 along the radial direction of the magnetic leg 2 is L-shaped, rectangle, square, etc. The first support strip 31 is disposed on the magnetic leg 2 and arranged between the magnetic leg 2 and the second support strip 32. In addition, the first support strip 31 has a top surface 31*a* and a bottom surface 31*b*. The top surface 31*a* and the bottom surface 32*b* are opposed to each other. The second support strip 32 is disposed on the first support strip 31 and arranged between the first support strip 31 and the winding 4. The second support strip 32 is used for installing and supporting the winding 4. In addition, the second support strip 32 has a top surface 32*a* and a bottom surface 32*b*. The top surface 32*a* and the bottom surface 32*b* are opposed to each other. The top surface 32*a* of the second support strip 32 is closer to the top surface 31*a* of first support strip 31 than the bottom surface 32*b* of the second support strip 32. The bottom surface 32*b* of the second support strip 32 is closer to the bottom surface 31*b* of first support strip 31 than the top surface 32*a* of the second support strip 32. In an embodiment, the first support strip 31 and the second support strip 32 are separate components. In some other embodiments, the first support strip 31 and the second support strip 32 are integrally formed as a one-piece structure.

The top surface 32*a* of the second support strip 32 is located at a level higher than the top surface 31*a* of the first support strip 31. Consequently, the first upper air gap part 51 is defined by the magnetic leg 2, the top surface 31*a* of the first support strip 31 and the second support strip 32 collaboratively. The first portion of the first upper air gap part 51 is arranged between the first projection line m and the top surface 31*a* of the first support strip 31. That is, the first portion of the first upper air gap part 51 is arranged between the first projection line m and the second projection line n. The second portion of the first upper air gap part 51 is beyond the region between the third projection line o and the fourth projection line p through the third projection line o.

The bottom surface 32*b* of the second support strip 32 is located at a level lower than the bottom surface 31*b* of the first support strip 31. Consequently, the first lower air gap part 52 is defined by the magnetic leg 2, the bottom surface 31*b* of the first support strip 31 and the second support strip 32 collaboratively. The first portion of the first lower air gap part 52 is arranged between the second projection line n and the bottom 31*b* of the first support strip 31. That is, the first portion of the first lower air gap part 52 is arranged between the first projection line m and the second projection line n. The second portion of the first lower air gap part 52 is beyond the region between the third projection line o and the fourth projection line p through the fourth projection line p.

In this embodiment, the distance between the projection point of the first endpoint 411 of the first end part 41 on the magnetic leg 2 and the projection point of the second endpoint 412 of the first end part 41 on the magnetic leg 2 is smaller than the depth of the first upper air gap part 51. That is, the vertical distance between the first projection line m and the third projection line o is smaller than the depth of the first upper air gap part 51. The direction of the depth of the first upper air gap part 51 is in parallel with the axial direction Y of the magnetic leg 2. The distance between the projection point of the third endpoint 421 of the second end part 42 on the magnetic leg 2 and the projection point of the fourth endpoint 422 of the second end part 42 on the magnetic leg 2 is smaller than the depth of the first lower air gap part 52. That is, the vertical distance between the second projection line n and the fourth projection line p is smaller than the depth of the first lower air gap part 52. The direction of the depth of the first lower air gap part 52 is in parallel with the axial direction Y of the magnetic leg 2.

The present disclosure further provides other possible embodiments of the magnetic elements. In the following embodiments, the magnetic element also has at least one first air gap 5. Like the first embodiment, a first portion of the first air gap 5 is arranged between the first projection line m and the second projection line n, and a second portion of the first air gap 5 is beyond the region between the third projection line o and the fourth projection line p through at least one of the third projection line o and the fourth projection line p. The benefits of the air gap are similar, and not redundantly described herein.

Figure 2:
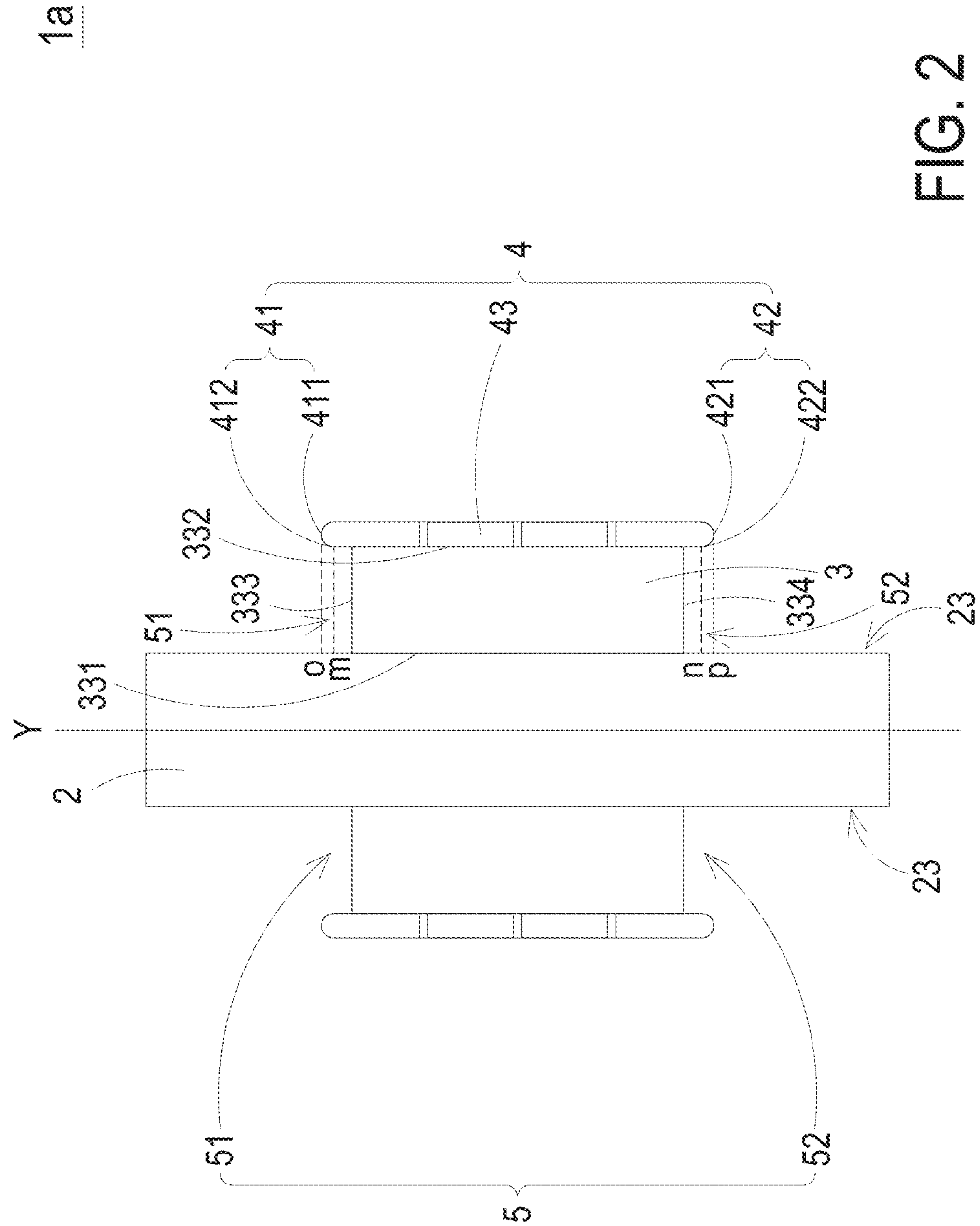
FIG. 2 is a schematic cross-sectional view illustrating the structure of a magnetic element according to a second embodiment of the present disclosure.

Please refer to FIG. 2. FIG. 2 is a schematic cross-sectional view illustrating the structure of a magnetic element according to a second embodiment of the present disclosure. The magnetic element 1*a* includes a magnetic core, at least one support strip assembly 3, a winding 4 and at least one first air gap 5. The functions and structures of the magnetic leg 2 and the winding 4 of the magnetic element 1*a* in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes a single support strip. The cross section of the support strip along the radial direction of the magnetic leg 2 is not restricted as long as the air gap can be defined by the support strip and the magnetic leg 2 collaboratively. Preferably but not exclusively, the cross section of the support strip along the radial direction of the magnetic leg 2 is L-shaped, rectangle, square, etc. The support strip has an inner surface 331, an outer surface 332, a top surface 333 and a bottom surface 334. The inner surface 331 and the outer surface 332 of the support strip are opposed to each other. The top surface 333 and the bottom surface 334 of the support strip are opposed to each other. In addition, the top surface 333 and the bottom surface 334 are arranged between the inner surface 331 and the outer surface 332. The top surface 333 of the support strip is closer to the first end part 41 of the winding 4 than the bottom surface 334 of the support strip. The bottom surface 334 of the support strip is closer to the second end part 42 of the winding 4 than the top surface 333 of the support strip. The inner surface 331 of the support strip is contacted with the magnetic leg 2. The winding 4 is disposed on the outer surface 332 of the support strip.

In this embodiment, the first air gap 5 includes a first upper air gap part 51 and a first lower air gap part 52. The first upper air gap part 51 is defined by the magnetic leg 2, the top surface 333 of the support strip and the winding 4 collaboratively. In addition, the first lower air gap part 52 is defined by the magnetic leg 2, the bottom surface 334 of the support strip and the winding 4 collaboratively. The first portion of the first upper air gap part 51 is arranged between the first projection line m and the top surface 333 of the support strip 31. That is, the first portion of the first upper air gap part 51 is arranged between the first projection line m and the second projection line n. The second portion of the first upper air gap part 51 is beyond the region between the third projection line o and the fourth projection line p through the third projection line o. A first portion of the first lower air gap part 52 is arranged between the second projection line n and the bottom surface 334 of the support strip. That is, the first portion of the first lower air gap part 52 is arranged between the first projection line m and the second projection line n. The second portion of the first lower air gap part 52 is beyond the region between the third projection line o and the fourth projection line p through the fourth projection line p.

In this embodiment, the length of the support strip is substantially equal to the distance between the top surface 333 and the bottom surface 334 of the support strip. The length of the support strip is greater than 80% of the distance between the first endpoint 411 of the first end part 41 and the third endpoint 421 of the second end part 42. In addition, the length of the support strip is smaller than the distance between the projection point of the second endpoint 412 of the first end part 41 on the magnetic leg 2 and the projection point of the fourth end point 422 of the second end part 42 on the magnetic leg 2. The direction of the support strip is in parallel with the axial direction Y of the magnetic leg 2. Since the length of the strip is specially designed, the support strip can support the winding 4 and prevent the winding 4 from falling off the support strip. Due to this structure design, the dielectric constant between the first end part 41 and the second end part 42 of the winding 4 on the magnetic leg 2 is reduced. Consequently, the electric field distribution of the first end part 41 and the second end part 42 will be more uniform and the partial discharge extinction voltage will be increased. In other words, the partial discharge problem is solved. The volume and the cost of the magnetic element 1*a* are both reduced. Consequently, the fabricating process of the magnetic element 1*a* of the present disclosure is simplified.

Figure 3:
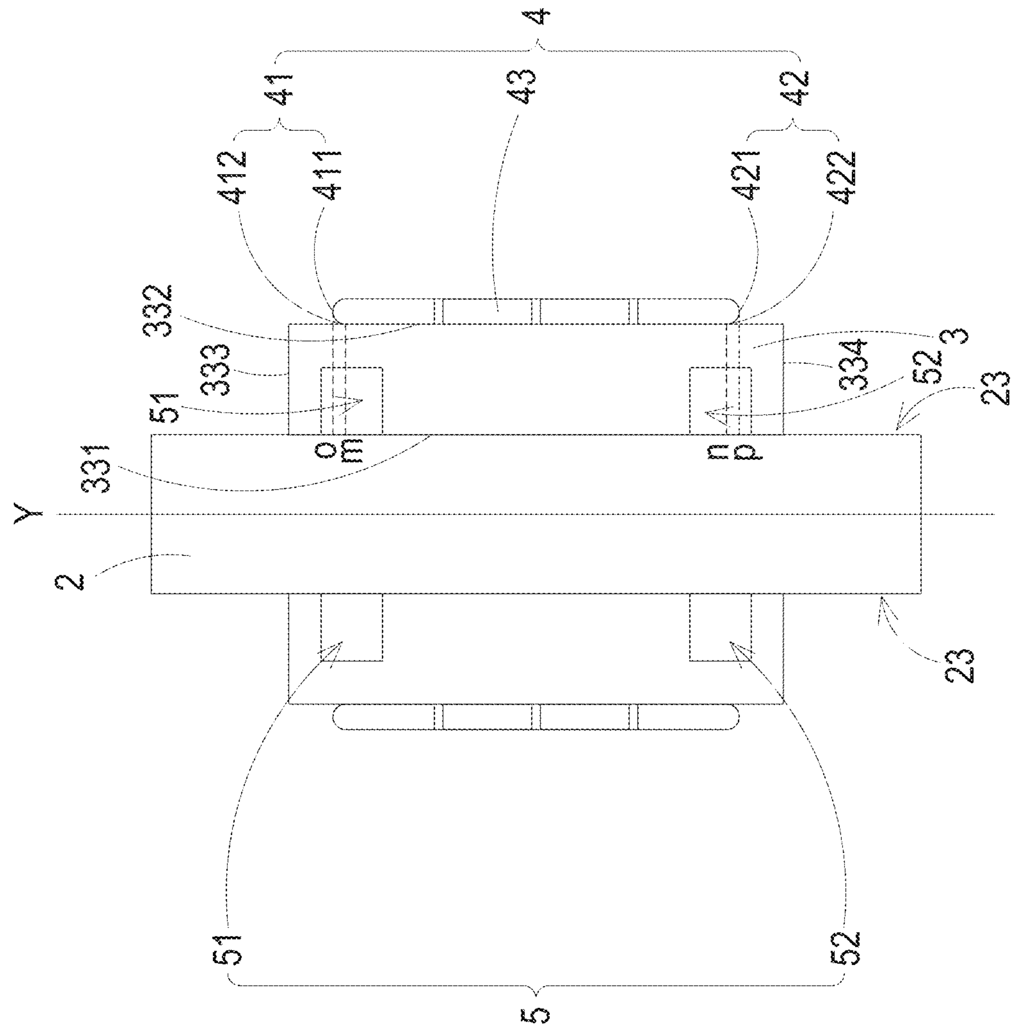
FIG. 3 is a schematic cross-sectional view illustrating the structure of a magnetic element according to a third embodiment of the present disclosure.

Please refer to FIG. 3. FIG. 3 is a schematic cross-sectional view illustrating the structure of a magnetic element according to a third embodiment of the present disclosure. The magnetic element 1*b* includes a magnetic core, at least one support strip assembly 3, a winding 4 and at least one first air gap 5. The functions and structures of the magnetic leg 2 and the winding 4 of the magnetic element 1*b* in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes a single support strip. The support strip has an inner surface 331, an outer surface 332, a top surface 333 and a bottom surface 334. The inner surface 331 and the outer surface 332 of the support strip are opposed to each other. The top surface 333 and the bottom surface 334 of the support strip are opposed to each other. In addition, and the top surface 333 and the bottom surface 334 are arranged between the inner surface 331 and the outer surface 332. The top surface 333 of the support strip is closer to the first end part 41 of the winding 4 than the bottom surface 334 of the support strip. The bottom surface 334 of the support strip is closer to the second end part 42 of the winding 4 than the top surface 333 of the support strip.

In addition, the support strip includes an upper region and a lower region. The upper region is the region of the support strip which is closer to the top surface 333 of the support strip. The lower region is the region of the support strip which is closer to the bottom surface 334 of the support strip. The inner surface 331 of the support strip is contacted with the magnetic leg 2. The winding 4 is disposed on the outer surface 332 of the support strip.

In this embodiment, the first air gap 5 includes at least one vacant space. The at least one vacant space is formed by drilling the support strip from a sidewall of the support strip. Each first air gap 5 includes a single first upper air gap part 51 and a single first lower air gap part 52. The first upper air gap part 51 is formed in the corresponding upper region of the support strip. That is, the first upper air gap part 51 is closer to the top surface 333 of the support strip. In addition, the first lower air gap part 52 is formed in the corresponding lower region of the support strip. That is, the first lower air gap part 52 is closer to the bottom surface 334 of the support strip. In this embodiment, a first portion of the first upper air gap part 51 is arranged between the first projection line m and the second projection line n. A second portion of the first upper air gap part 51 is beyond the region between the third projection line o and the fourth projection line p through the third projection line o. In addition, a first portion of the first lower air gap part 52 is arranged between the first projection line m and the second projection line n. A second portion of the first lower air gap part 52 is beyond the region between the third projection line o and the fourth projection line p through the fourth projection line p.

In some embodiments, each of the first upper air gap part 51 and the first lower air gap part 52 includes at least one vacant space. The at least one vacant space is formed by drilling the support strip from the inner surface 331 of the support strip. Consequently, the first upper air gap part 51 is formed in the corresponding upper region of the support strip and located adjacent to the top surface 333, and the first lower air gap part 52 is formed in the corresponding lower region of the support strip and located adjacent to the bottom surface 334.

Figure 4:
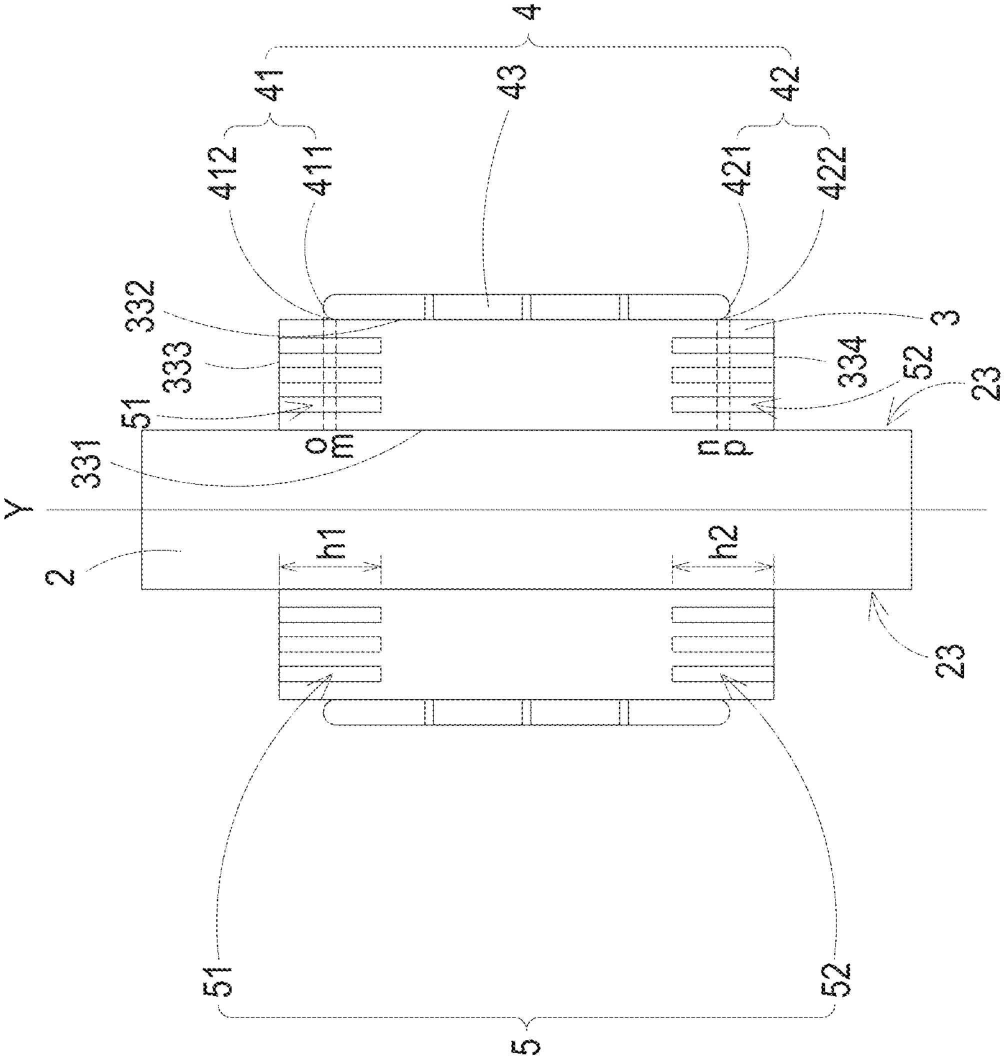
FIG. 4 is a schematic cross-sectional view illustrating the structure of a magnetic element according to a fourth embodiment of the present disclosure.

Please refer to FIG. 4. FIG. 4 is a schematic cross-sectional view illustrating the structure of a magnetic element according to a fourth embodiment of the present disclosure. The magnetic element 1*c* includes a magnetic core, at least one support strip assembly 3, a winding 4 and at least one first air gap 5. The functions and structures of the magnetic leg 2 and the winding 4 of the magnetic element 1*c* in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes a single support strip. The length of the support strip in parallel with the axial direction Y of the magnetic leg 2 is greater than or equal to the length between the first endpoint 411 and the third endpoint 421. The support strip includes an inner surface 331, an outer surface 332, a top surface 333 and a bottom surface 334. The inner surface 331 and the outer surface 332 of the support strip are opposed to each other. The top surface 333 and the bottom surface 334 of the support strip are opposed to each other. In addition, the top surface 333 and the bottom surface 334 are arranged between the inner surface 331 and the outer surface 332. The top surface 333 of the support strip is closer to the first end part 41 of the winding 4 than the bottom surface 334 of the support strip. The bottom surface 334 of the support strip is closer to the second end part 42 of the winding 4 than the top surface 333 of the support strip. The inner surface 331 of the support strip is contacted with the magnetic leg 2. The winding 4 is disposed on the outer surface 332 of the support strip.

In this embodiment, the first air gap 5 includes at least one first upper air gap part 51 and at least one first lower air gap part 52.

For example, each first upper air gap part 51 is a vacant space that is formed by drilling the support strip from the top surface 333 toward the bottom surface 334 of the support strip. The shape of the vacant space is not restricted. The at least one first upper air gap part 51 has a first depth h1 in parallel with axial direction Y of the magnetic leg 2. The number of the at least one first upper air gap part 51 is one or more than one. In case that the at least one first upper air gap part 51 is a single upper air gap part, the first upper air gap part 51 has the first depth h1 in parallel with the axial direction Y of the magnetic leg 2. In case that the at least one first upper air gap part 51 includes a plurality of first upper air gap parts, each first upper air gap part 51 has a first depth h1 in parallel with axial direction Y of the magnetic leg 2, or at least one of the plurality of first upper air gap parts 51 has the first depth h1 in parallel with axial direction Y of the magnetic leg 2. A first projection line m is formed between the projection point of the second endpoint 412 on the magnetic leg 2 and the second endpoint 412. A third projection line o is formed between the projection point of the first endpoint 411 on the magnetic leg 2 and the first endpoint 411. In an embodiment, the vertical length between the first projection line m and the third projection line o is smaller than the first depth h1.

Similarly, each first lower air gap part 52 is a vacant space that is formed by drilling the support strip from the bottom surface 334 toward the top surface 333 of the support strip. The at least one first lower air gap part 52 has a second depth h2 in parallel with the axial direction Y of the magnetic leg 2. The number of the at least one first lower air gap part 52 is one or more than one. In case that the at least one first lower air gap part 52 is a single lower air gap part, the first lower air gap part 52 has the second depth h2 in parallel with the axial direction Y of the magnetic leg 2. In case that the at least one first lower air gap part 52 includes a plurality of first lower air gap parts, each first lower air gap part 52 has a second depth h2 in parallel with axial direction Y of the magnetic leg 2, or at least one of the plurality of first lower air gap parts 52 has the second depth h2 in parallel with axial direction Y of the magnetic leg 2. A second projection line n is formed between the projection point of the fourth endpoint 422 on the magnetic leg 2 and the fourth endpoint 422. A fourth projection line p is formed between the projection point of the third endpoint 421 on the magnetic leg 2 and the third endpoint 421. The vertical length between the second projection line n and the fourth projection line p is smaller than the second depth h2.

In this embodiment, the sum of the first depth h1 of the first upper air gap part 51 and the second depth h2 of the first lower air gap part 52 is smaller than the length of the support strip assembly 3 in parallel with the axial direction Y of the magnetic leg 2. In this embodiment, each first upper air gap part 51 is exposed to the top surface 333 of the support strip, and each first lower air gap part 52 is exposed to the bottom surface 334 of the support strip.

Figure 5:
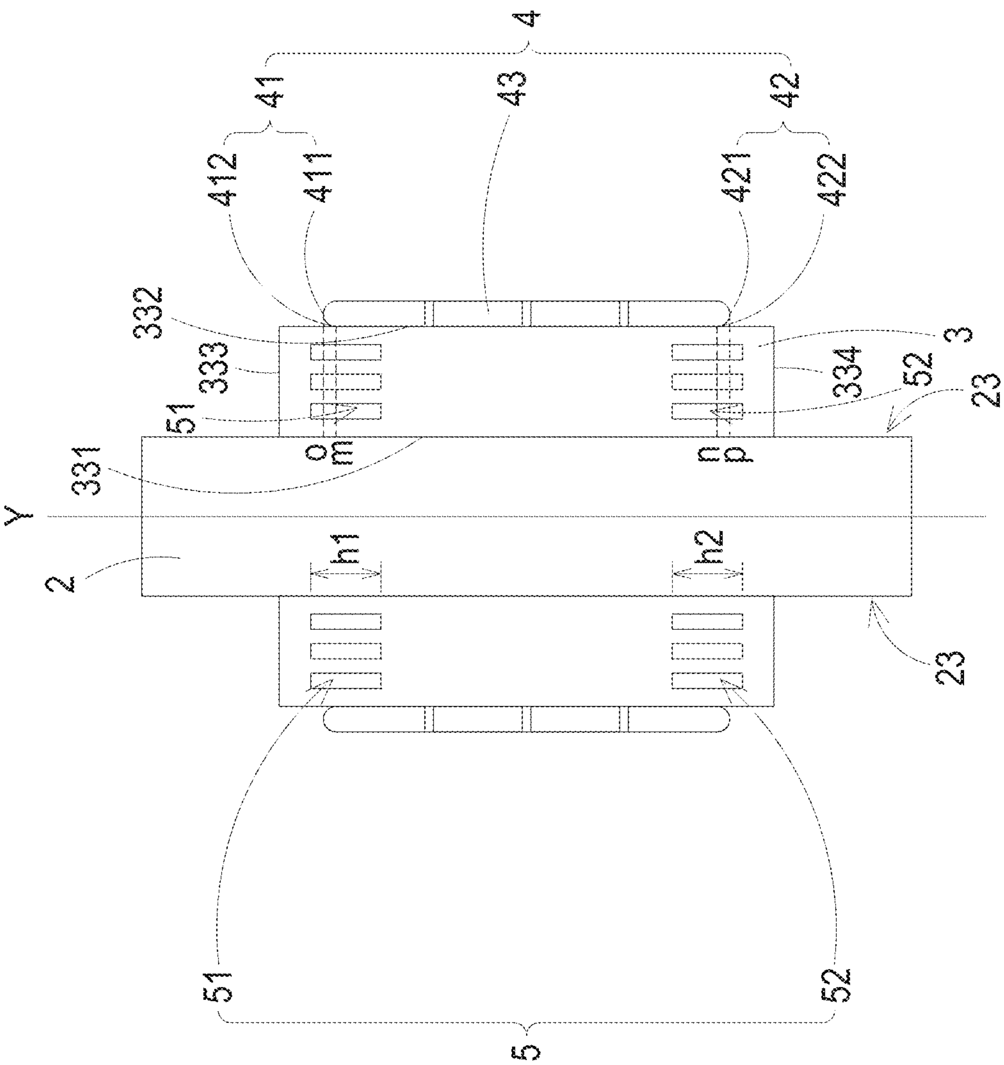
FIG. 5 is a schematic cross-sectional view illustrating the structure of a magnetic element according to a fifth embodiment of the present disclosure.

Please refer to FIG. 5. FIG. 5 is a schematic cross-sectional view illustrating the structure of a magnetic element according to a fifth embodiment of the present disclosure. The magnetic element 1*d* includes a magnetic core, at least one support strip assembly 3, a winding 4 and at least one first air gap 5. The functions and structures of the magnetic leg 2 and the winding 4 of the magnetic element 1*d* in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes a single support strip. The length of the support strip in parallel with the axial direction Y of the magnetic leg 2 is greater than the length between the first endpoint 411 and the third endpoint 421 of the winding 4. The support strip includes an inner surface 331, an outer surface 332, a top surface 333 and a bottom surface 334. The inner surface 331 and the outer surface 332 of the support strip are opposed to each other. The top surface 333 and the bottom surface 334 of the support strip are opposed to each other. In addition, the top surface 333 and the bottom surface 334 are arranged between the inner surface 331 and the outer surface 332. The top surface 333 of the support strip is closer to the first end part 41 of the winding 4 than the bottom surface 334 of the support strip. The bottom surface 334 of the support strip is closer to the second end part 42 of the winding 4 than the top surface 333 of the support strip. The inner surface 331 of the support strip is contacted with the magnetic leg 2. The winding 4 is disposed on the outer surface 332 of the support strip.

In this embodiment, the first air gap 5 includes at least one first upper air gap part 51 and at least one first lower air gap part 52.

For example, each first upper air gap part 51 is a vacant space that is formed by drilling the upper region of the support strip from a sidewall of the support strip. Similarly, each first lower air gap part 52 is a vacant space that is formed by drilling the lower region of the support strip from a sidewall of the support strip.

The at least one first upper air gap part 51 has a first depth h1. The direction of the first depth h1 is in parallel with axial direction Y of the magnetic leg 2. The number of the at least one first upper air gap part 51 is one or more than one. In case that the at least one first upper air gap part 51 includes a plurality of first upper air gap parts, each first upper air gap part 51 has a first depth h1 in parallel with axial direction Y of the magnetic leg 2, or at least one of the plurality of first upper air gap parts 51 has the first depth h1 in parallel with axial direction Y of the magnetic leg 2. A first projection line m is formed between the projection point of the second endpoint 412 on the magnetic leg 2 and the second endpoint 412. A third projection line o is formed between the projection point of the first endpoint 411 on the magnetic leg 2 and the first endpoint 411. The vertical length between the first projection line m and the third projection line o is smaller than the first depth h1.

The at least one first lower air gap part 52 has a second depth h2. The direction of the second depth h2 is in parallel with axial direction Y of the magnetic leg 2. The number of the at least one first lower air gap part 52 is one or more than one. In case that the at least one first lower air gap part 52 includes a plurality of first lower air gap parts, each first lower air gap part 52 has a second depth h2 in parallel with axial direction Y of the magnetic leg 2, or at least one of the plurality of first lower air gap parts 52 has the second depth h2 in parallel with axial direction Y of the magnetic leg 2. A second projection line n is formed between the projection point of the fourth endpoint 422 on the magnetic leg 2 and the fourth endpoint 422. A fourth projection line p is formed between the projection point of the third endpoint 421 on the magnetic leg 2 and the third endpoint 421. The vertical length between the second projection line n and the fourth projection line p is smaller than the second depth h2.

In this embodiment, the sum of the first depth h1 of the first upper air gap 51 and the second depth h2 of the first lower air gap 52 is smaller than the length of the support strip assembly 3 in parallel with the axial direction Y of the magnetic leg 2. In addition, in this embodiment, each first upper air gap part 51 is not exposed to the top surface 333 of the support strip. That is, each first upper air gap 51 is arranged between the top surface 333 and the bottom surface 334 of the support strip. Similarly, each first lower air gap part 52 is not exposed to the bottom surface 334 of the support strip. That is, each first lower air gap 52 is arranged between the top surface 333 and the bottom surface 334 of the support strip.

Figure 6:
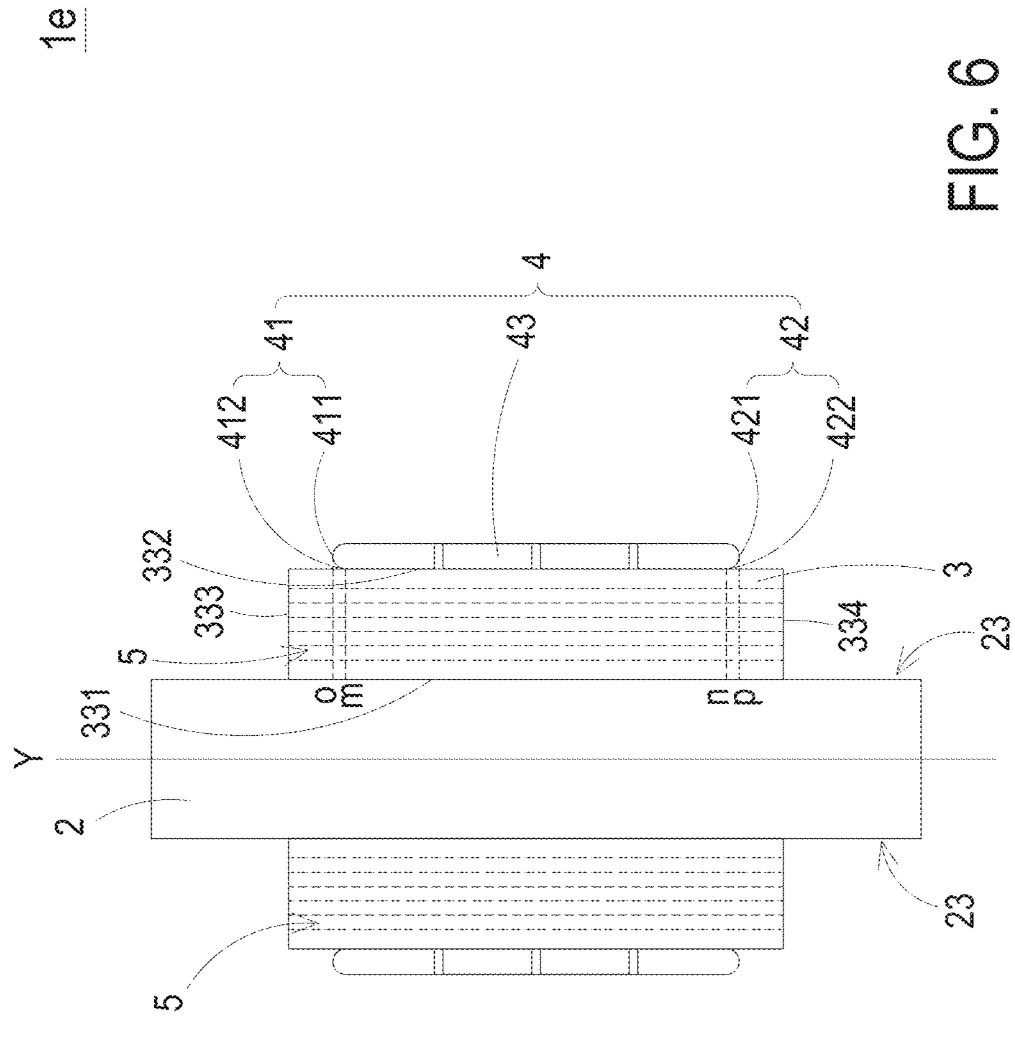
FIG. 6 is a schematic cross-sectional view illustrating the structure of a magnetic element according to a sixth embodiment of the present disclosure.

Please refer to FIG. 6. FIG. 6 is a schematic cross-sectional view illustrating the structure of a magnetic element according to a sixth embodiment of the present disclosure. The magnetic element 1*e* includes a magnetic core, at least one support strip assembly 3, a winding 4 and at least one first air gap 5. The functions and structures of the magnetic leg 2 and the winding 4 of the magnetic element 1*e* in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes a single support strip. The length of the support strip in parallel with the axial direction Y of the magnetic leg 2 is greater than or equal to the length between the first endpoint 411 and the third endpoint 421 of the winding 4. The support strip includes an inner surface 331, an outer surface 332, a top surface 333 and a bottom surface 334. The inner surface 331 and the outer surface 332 of the support strip are opposed to each other. The top surface 333 and the bottom surface 334 of the support strip are opposed to each other. In addition, the top surface 333 and the bottom surface 334 are arranged between the inner surface 331 and the outer surface 332. The top surface 333 of the support strip is closer to the first end part 41 of the winding 4 than the bottom surface 334 of the support strip. The bottom surface 334 of the support strip is closer to the second end part 42 of the winding 4 than the top surface 333 of the support strip. The inner surface 331 of the support strip is contacted with the magnetic leg 2. The winding 4 is disposed on the outer surface 332 of the support strip.

In this embodiment, the magnetic element 1*e* includes at least one first air gap 5. The at least one first air gap 5 runs through the top surface 333 and the bottom surface 334 of the support strip. For example, the first air gap 5 is formed by drilling the support strip from the top surface 333 to the bottom surface 334, so that at least one vacant space is formed in the support strip.

The number of the at least one first air gap 5 is one or more than one. In case that at least one first air gap 5 includes a single first air gap 5, the first air gap 5 runs through the top surface 333 and the bottom surface 334 of the support strip. A first portion of the first air gap 5 is arranged between the first projection line m and the second projection line n. A second portion of the first air gap 5 is beyond the region between the third projection line o and the fourth projection line p through the third projection line o. In addition, a third portion of the first air gap 5 is beyond the region between the third projection line o and the fourth projection line p through the fourth projection line p.

In case that at least one first air gap 5 includes a plurality of first air gaps 5, the plurality of first air gaps 5 are formed between the inner surface 331 and the outer surface 332 of the support strip and arranged sequentially. Moreover, all of the plurality of first air gaps 5 run through the top surface 333 and the bottom surface 334 of the support strip, or at least one of the plurality of first air gaps 5 runs through the top surface 333 and the bottom surface 334 of the support strip. Moreover, in all of the plurality of first air gaps 5 or in at least one of the plurality of first air gaps 5, a first portion of the first air gap 5 is arranged between the first projection line m and the second projection line n, a second portion of the first air gap 5 is beyond the region between the third projection line o and the fourth projection line p through the third projection line o, and a third portion of the first air gap 5 is beyond the region between the third projection line o and the fourth projection line p through the fourth projection line p.

Figure 7:
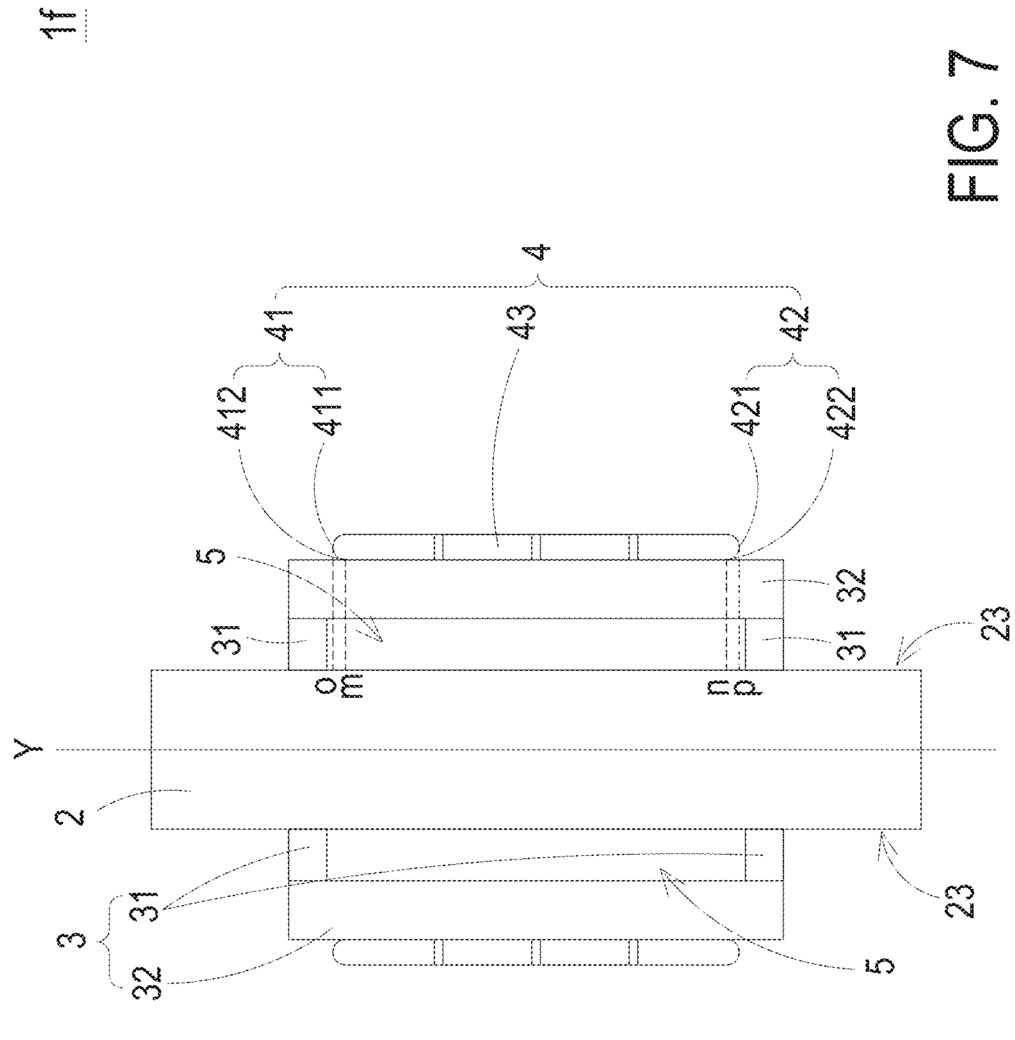
FIG. 7 is a schematic cross-sectional view illustrating the structure of a magnetic element according to a seventh embodiment of the present disclosure.

Please refer to FIG. 7. FIG. 7 is a schematic cross-sectional view illustrating the structure of a magnetic element according to a seventh embodiment of the present disclosure. The magnetic element 1*f* includes a magnetic core, at least one support strip assembly 3, a winding 4 and at least one first air gap 5. The functions and structures of the magnetic leg 2 and the winding 4 of the magnetic element If in this embodiment are similar to those of FIG. 1, and not redundantly described herein. Component parts and elements corresponding to those of the first embodiment are designated by identical numeral references, and detailed descriptions thereof are omitted.

In this embodiment, the support strip assembly 3 includes two first support strips 31 and a second support strip 32. The two first support strips 31 are discretely arranged between the magnetic leg 2 and the second support strip 32. The first air gap 5 is defined by the two first support strips 31, the magnetic leg 2 and the second support strip 32 collaboratively. The two first support strips 31 are disposed on two ends of the second support strip 32, respectively. In an embodiment, the two first support strips 31 and the second support strip 32 are integrally formed as a one-piece structure. In another embodiment, one of the two first support strips 31 and the second support strip 32 are integrally formed as a one-piece structure, and the other first support strip 31 is a separate component. Alternatively, the two first support strips 31 and the second support strip 32 are three separate components.

The second support strip 32 is disposed on the two first support strips 31, and the second support strip 32 is arranged between the two first support strips 31 and the winding 4. Moreover, the winding 4 is disposed on the second support strip 32. A first portion of the first air gap 5 is arranged between the first projection line m and the second projection line n. A second portion of the first air gap 5 is beyond the region between the third projection line o and the fourth projection line p through the third projection line o. A third portion of the first air gap 5 is beyond the region between the third projection line o and the fourth projection line p through the fourth projection line p.

In some embodiments, the magnetic element includes a single support strip assembly and a single winding. In some other embodiments, the magnetic element includes a plurality of support strip assemblies and a plurality of windings. An exemplary magnetic element including two support strip assemblies and two windings is described as following.

Figure 8:
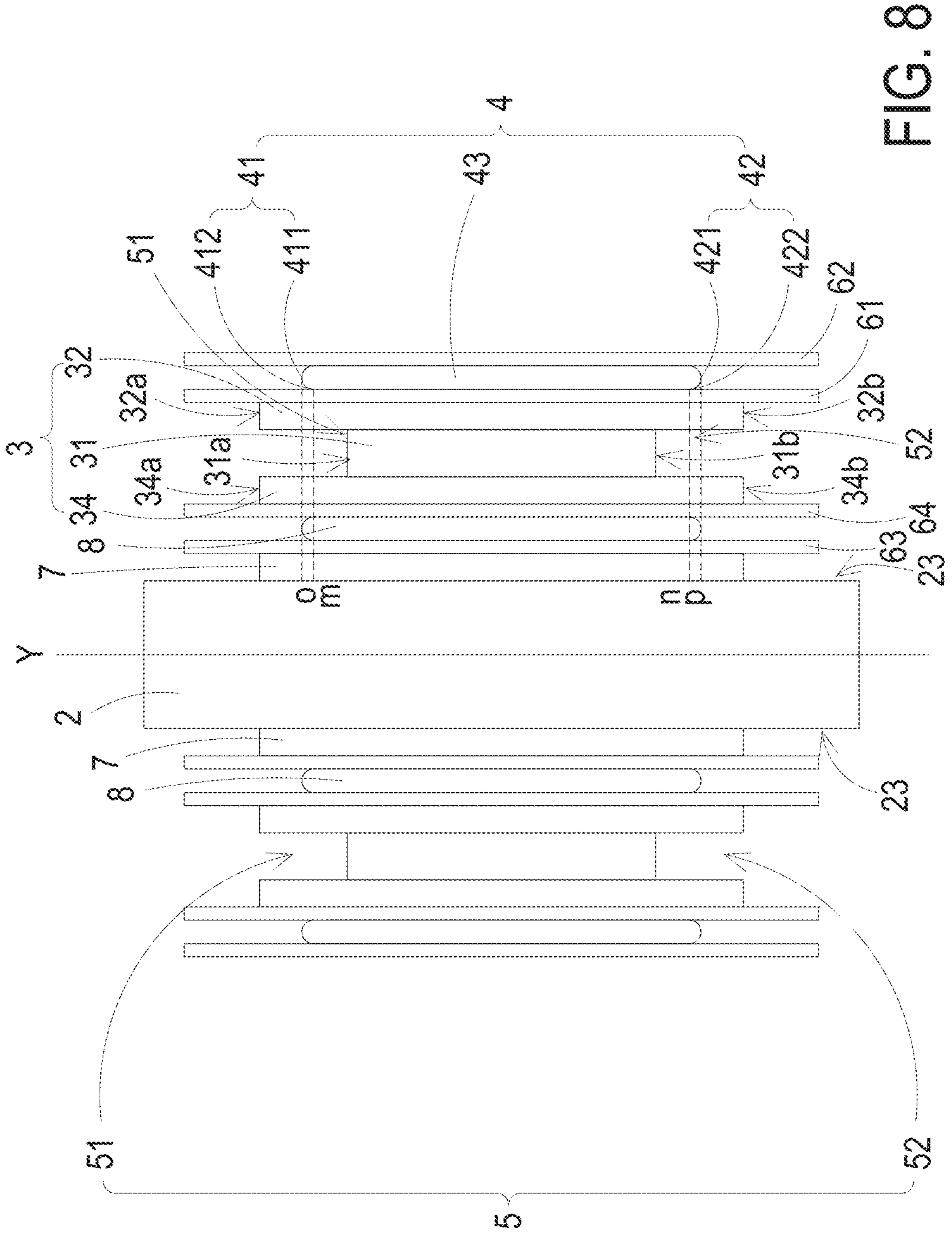
FIG. 8 is a schematic cross-sectional view illustrating the structure of a magnetic element according to an eighth embodiment of the present disclosure.

Please refer to FIG. 8. FIG. 8 is a schematic cross-sectional view illustrating the structure of a magnetic element according to an eighth embodiment of the present disclosure. The magnetic element 1*g* includes a magnetic core, at least one first support strip assembly 7, at least one second support strip assembly 3, a first winding 8, a second winding 4 and at least one first air gap 5. The functions and structures of the magnetic leg 2, the second winding 4, and the first air gap 5 in this embodiment are similar to those of FIG. 1, and not redundantly described herein. Component parts and elements corresponding to those of the first embodiment are designated by identical numeral references, and detailed descriptions thereof are omitted.

In this embodiment, the first support strip assembly 7 of the magnetic element 1*g* includes a single support strip or a plurality of support strips. The first support strip assembly 7 is disposed on the magnetic leg 2. The first winding 8 is disposed on the first support strip assembly 7. The first winding 8 of the magnetic element 1*g* is a low voltage winding. The first winding 8 is wound around the first support strip assembly 7. The second support strip assembly 3 is disposed on the first winding 8. For example, the second winding 4 is a high voltage winding. The second winding 4 is wound around the second support strip assembly 3. It is noted that numerous modifications and alterations may be made while retaining the teachings of the disclosure. For example, in some other embodiments, the first winding 8 is a high voltage winding, and the second winding 4 is a low voltage winding.

In some embodiments, the number of the first air gaps 5 and the number of the second support strip assemblies 3 are equal. In addition, the locations of the first air gaps 5 correspond to the locations of the second support strip assemblies 3. Each first air gap 5 is closer to the corresponding second support strip assembly 3. In addition, each first air gap 5 is at least defined by the adjacent second support strip assembly 3. The first air gap 5 is arranged between the first winding 8 and the second winding 4. Each first air gap 5 includes a first upper air gap part 51 and a first lower air gap part 52. The first upper air gap part 51 is closer to the first end part 41 of the second winding 4 than the first lower air gap part 52. The first lower air gap part 52 is closer to the second end part 42 of the second winding 4 than the first upper air gap part 51.

In this embodiment, the second support strip assembly 3 of the magnetic element 1*g* includes a first support strip 31, a second support strip 32 and a third support strip 34. The third support strip 34 is disposed on the first winding 8. In addition, the third support strip 34 is arranged between the first support strip 31 and the first winding 8. The first support strip 31 is disposed on the third support strip 34. In addition, the first support strip 31 is arranged between the second support strip 32 and the third support strip 34. The second support strip 32 is disposed on the first support strip 32. In addition, the second support strip 32 is arranged between the first support strip 31 and the second winding 4. The second winding 4 is disposed on the second support strip 32. In an embodiment, at least two of the first support strip 31, the second support strip 32 and the third support strip 34 are integrally formed as a one-piece structure. In another embodiment, the first support strip 31, the second support strip 32 and the third support strip 34 are three separate components.

The first support strip 31 has a top surface 31*a* and a bottom surface 31*b*. The top surface 31*a* and the bottom surface 31*b* are opposed to each other. The second support strip 32 has a top surface 32*a* and a bottom surface 32*b*. The top surface 32*a* and the bottom surface 32*b* are opposed to each other. The top surface 32*a* of the second support strip 32 is closer to the top surface 31*a* of the first support strip 31 than the bottom surface 32*b*. The bottom surface 32*b* of the second support strip 32 is closer to the bottom surface 31*b* of the first support strip 31 than the top surface 32*a*. Moreover, the third support strip 34 has a top surface 34*a* and a bottom surface 34*b*. The top surface 34*a* and the bottom surface 34*b* are opposed to each other. The top surface 34*a* of the third support strip 34 is closer to the top surface 31*a* of the first support strip 31 and the top surface 32*a* of the second support strip 32 than the bottom surface 34*b*. The bottom surface 34*b* of the third support strip 34 is closer to the bottom surface 31*b* of the first support strip 31 and the bottom surface 32*b* of the second support strip 32 than the top surface 34*a*.

The top surface 34*a* of the third support strip 34 and the top surface 32*a* of the second support strip 32 are located at a level higher than the top surface 31*a* of the first support strip 31. Consequently, the first upper air gap part 51 is defined by the third support strip 34, the top surface 31*a* of the first support strip and the second support strip 32 collaboratively. A first portion of the first upper air gap part 51 is arranged between the first projection line m and the top surface 31*a* of the first support strip 31. That is, the first portion of the first upper air gap part 51 is arranged between the first projection line m and the second projection line n. A second portion of the first upper air gap part 51 is beyond the region between the third projection line o and the fourth projection line p through the third projection line o. The bottom surface 34*b* of the third support strip 34 and the bottom surface 32*b* of the second support strip 32 are located at a level lower than the bottom surface 31*b* of the first support strip 31. Consequently, the first lower air gap part 52 is defined by the third support strip 34, the bottom surface 31*b* of the first support strip 31 and the second support strip 32 collaboratively. A first portion of the first lower air gap part 52 is arranged between the second projection line n and the bottom surface 31*b* of the first support strip 31. That is, the first portion of the first lower air gap part 52 is arranged between the first projection line m and the second projection line n. A second portion of the first lower air gap part 52 is beyond the region between the third projection line o and the fourth projection line p through the fourth projection line p.

Please refer to FIG. 8 again. In this embodiment, the magnetic element 1*g* further includes a first insulation layer 61, a second insulation layer 62, a third insulation layer 63 and a fourth insulation layer 64. The first insulation layer 61 is disposed on and arranged around the inner periphery side of the second winding 4. The first insulation layer 61 is used for isolating the second support strip assembly 3 from the second winding 4. The second insulation layer 62 is disposed on and arranged around the outer periphery side of the second winding 4. The second insulation layer 62 is used for isolating the second winding 4 from the external components. The third insulation layer 63 is disposed on and arranged around the inner periphery side of the first winding 8. The third insulation layer 63 is used for isolating the first support strip assembly 7 from the first winding 8. The fourth insulation layer 64 is disposed on and arranged around the outer periphery side of the first winding 8. The fourth insulation layer 64 is used for isolating the second support strip assembly 3 from the first winding 8. Moreover, the first insulation layer 61, the second insulation layer 62, the third insulation layer 63, and the fourth insulation layer 64 are NOMEX papers or composite insulation papers.

In the embodiment of the magnetic element 1*g* as shown in FIG. 8, the second support strip assembly 3 includes the first support strip 31, the second support strip 32 and the third support strip 34. It is noted that numerous modifications and alterations may be made while retaining the teachings of the disclosure. For example, the second support strip assembly 3 may be replaced by the support strip assembly in each of the magnetic elements as shown in FIGS. 2 to 7. Hereinafter, some variant examples of the magnetic element 1*g* will be described. For succinctness, only the variations of the second support strip assembly 3 will be described as follows.

In a first variant example of the magnetic element 1*g*, the second support strip assembly 3 is replaced by the support strip assembly 3 as shown in FIG. 2. In this embodiment, each first air gap 5 includes a first upper air gap part 51 and a first lower air gap part 52. Each second support strip assembly 3 includes a support strip. The inner surface 331 of the support strip is disposed on the first winding 8. The second winding 4 is disposed on the outer surface 332 of the support strip. The inner surface 331 and the outer surface 332 of the support strip are opposed to each other. The first upper air gap part 51 is defined by the first winding 8, the top surface 333 of the support strip and the second winding 4 collaboratively. A first portion of the first upper air gap part 51 is arranged between the first projection line m and the second projection line n. A second portion of the first upper air gap part 51 is beyond the region between the third projection line o and the fourth projection line p through the third projection line o. The first lower air gap part 52 is defined by the first winding 8, the bottom surface of the support strip 334 and the second winding 4 collaboratively. A first portion of the first lower air gap part 52 is arranged between the first projection line m and the second projection line n. A second portion of the first lower air gap part 52 is beyond the region between the third projection line o and the fourth projection line p through the fourth projection line p.

In this embodiment, the length of the support strip is greater than 80% of the distance between the first endpoint 411 and the third endpoint 421 of the second winding 4. In addition, the length of the support strip is smaller than the distance between the projection point of the second end part 412 of the second winding 4 on the magnetic leg 2 and the projection point of the fourth endpoint 422 of the second winding 4 on the magnetic leg 2. The direction of the support strip is in parallel with the axial direction Y of the magnetic leg 2.

In a second variant example of the magnetic element 1*g*, the second support strip assembly 3 is replaced by the support strip assembly 3 as shown in FIG. 3, 4 or 5. In this embodiment, each first air gap 5 includes at least one first upper air gap part 51 and at least one first lower air gap part 52. Each second support strip assembly 3 includes a support strip. That is, the at least one first upper air gap part 51 and the at least one first lower air gap part 52 are formed in the support strip. In addition, the at least one first upper air gap part 51 and the at least one first lower air gap part 52 are respectively disposed at the upper region and lower region. A first portion of the first upper air gap part 51 is arranged between the first projection line m and the second projection line n. A second portion of the first upper air gap part 51 is beyond the region between the third projection line o and the fourth projection line p through the third projection line o. A first portion of the first lower air gap part 52 is arranged between the first projection line m and the second projection line n. A second portion of the first lower air gap part 52 is at least beyond the region between the third projection line o and the fourth projection line p through the fourth projection line p.

In a third variant example of the magnetic element 1*g*, the second support strip assembly 3 is replaced by the support strip assembly 3 as shown in FIG. 6. In this embodiment, the second support strip assembly 3 includes a single support strip. In this embodiment, the length of the support strip is greater than the distance between the first endpoint 411 and the third endpoint 421 of the second winding 4. In addition, the direction of the support strip is in parallel with the axial direction Y of the magnetic leg 2. At least a first air gap 5 is formed in the support strip. The first air gap 5 runs through the top surface 333 and the bottom surface 334 of the support strip.

In a fourth variant example of the magnetic element 1*g*, the second support strip assembly 3 is replaced by the support strip assembly 3 as shown in FIG. 7. In this embodiment, the second support strip assembly 3 includes two first support strips 31 and a second support strip 32. The two first support strips 31 are discretely arranged between the first winding 8 and the second support strip 32. In addition, the two first support strips 31 are disposed on two ends of the second support strip 32, respectively. The second support strip 32 is disposed on the two first support strips 31, and the second support strip 32 is arranged between the two first support strips 31 and the second winding 4. Moreover, the second winding 4 is disposed on the second support strip 32. The at least one first air gap 5 is defined by the first winding 8, the two first support strips 31 and the second support strip 32 collaboratively. A first portion of the first air gap 5 is arranged between the first projection line m and the second projection line n. A second portion of the first air gap 5 is beyond the region between the third projection line o and the fourth projection line p through the third projection line o. A third portion of the first air gap 5 is beyond the region between the third projection line o and the fourth projection line p through the fourth projection line p.

Figure 9:
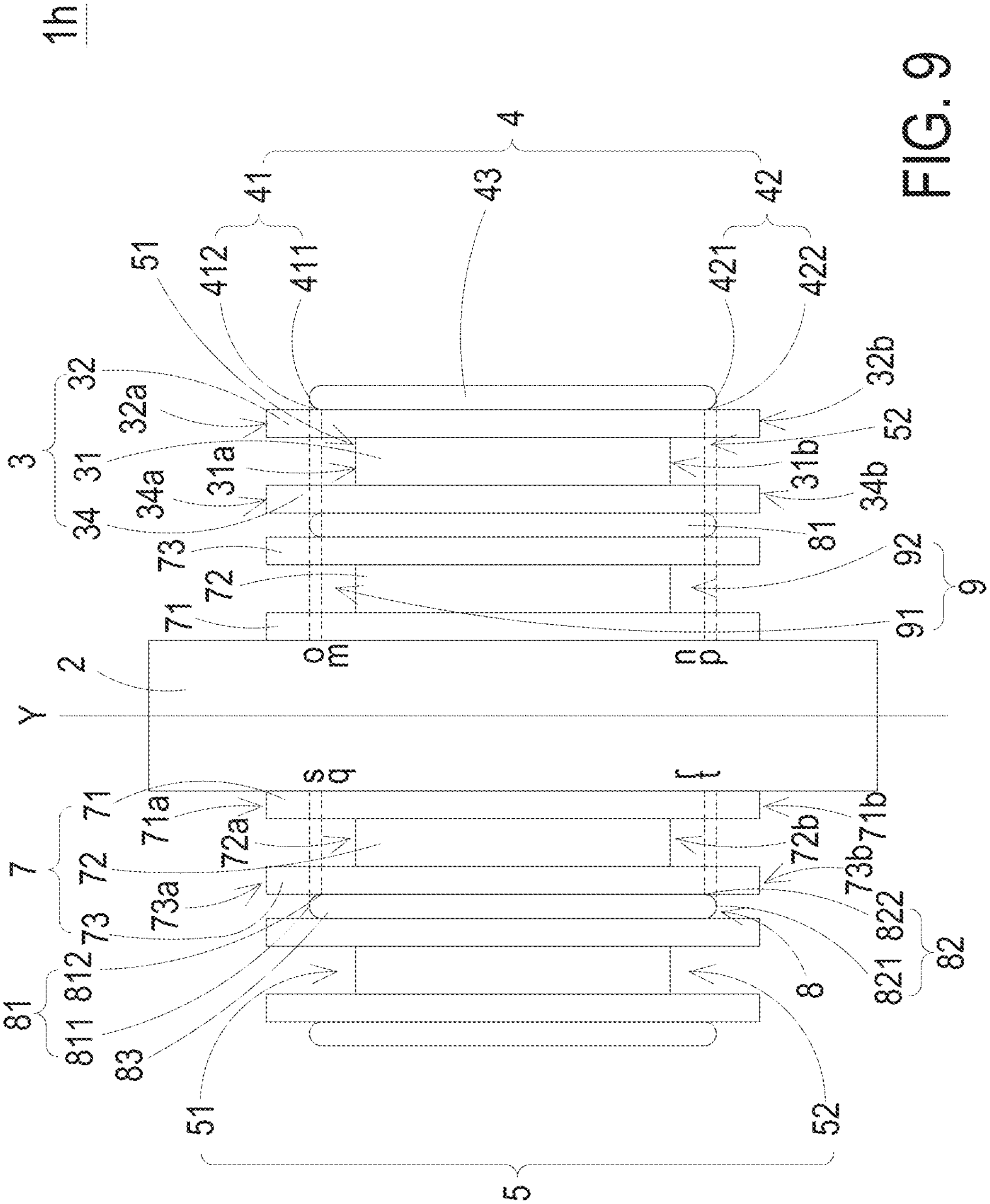
FIG. 9 is a schematic cross-sectional view illustrating the structure of a magnetic element according to a ninth embodiment of the present disclosure.

Please refer to FIG. 9. FIG. 9 is a schematic cross-sectional view illustrating the structure of a magnetic element according to a ninth embodiment of the present disclosure. The magnetic element 1*h* includes a magnetic core, at least one first support strip assembly 7, at least one second support strip assembly 3, a first winding 8, a second winding 4 and at least one first air gap 5. The functions and structures of the magnetic leg 2, the second support strip assembly 3, the second winding 4 and the first air gap 5 in this embodiment are similar to those of FIG. 8, and not redundantly described herein. Component parts and elements corresponding to those of the eighth embodiment as shown in FIG. 8 are designated by identical numeral references, and detailed descriptions thereof are omitted. In comparison with the magnetic element 1*g* of FIG. 8, the first winding 8 in the magnetic element 1*h* of this embodiment includes a third end part 81, a fourth end part 82 and a second connection part 83. The third end part 81 and the fourth end part 82 of the first winding 8 are connected with the top side and the bottom side of the second connection part 83, respectively. The third end part 81 includes a fifth endpoint 811 and a sixth endpoint 812. The fifth endpoint 811 is the farthest point of the third end part 81 away from the top side of the second connection part 83. The fifth endpoint 811 and the sixth endpoint 812 are connected with each other. The connection line between the fifth endpoint 811 and the sixth endpoint 812 is an inclined line or a curved line. Due to the incline line or the curved line, the third end part 81 has a chamfer. The sixth endpoint 812 is connected with the second connection part 83. A fifth projection line q is formed between the projection point of the sixth endpoint 812 on the magnetic leg 2 and the sixth endpoint 812.

The fourth end part 82 includes a seventh endpoint 821 and an eighth endpoint 822. The seventh endpoint 821 is the farthest point of the fourth end part 82 away from the bottom side of the second connection part 83. The seventh endpoint 821 and the eighth endpoint 822 are connected with each other. The connection line between the seventh endpoint 821 and the eighth endpoint 822 is an inclined line or a curved line. Due to the incline line or the curved line, the fourth end part 82 has a chamfer. The eighth endpoint 822 is connected with the second connection part 83. A sixth projection line r is formed between the projection point of the eighth endpoint 822 on the magnetic leg 2 and the eighth endpoint 822.

The connection line between the fifth endpoint 811 of the third end part 81 and the seventh endpoint 821 of the fourth end part 82 is the longest distance of the first winding 8 in parallel with the axial direction Y of the magnetic leg 2. A seventh projection line s is formed between the projection point of the fifth endpoint 811 on the magnetic leg 2 and the fifth endpoint 811. An eighth projection line t is formed between the projection point of the seventh endpoint 821 on the magnetic leg 2 and the seventh endpoint 821.

In this embodiment, the magnetic element 1*h* includes at least one second air gap 9. The number of the second air gaps 9 and the number of the first support strip assemblies 7 are equal. In addition, the locations of the second air gaps 9 correspond to the locations of the first support strip assemblies 7. Each second air gap 9 is at least defined by the adjacent first support strip assembly 7. In addition, each second air gap 9 is arranged between the first winding 8 and the magnetic leg 2. A first portion of the second air gap 9 is arranged between the fifth projection line q and the sixth projection line r. A second portion of the second air gap 9 is beyond the region between the seventh projection line s and the eighth projection line t through at least one of the seventh projection line s and the eighth projection line t.

In this embodiment, each second air gap 9 includes a second upper air gap part 91 and a second lower air gap part 92. The second upper air gap part 91 is closer to the third end part 81 of the first winding 8 than the second lower air gap part 92. The second lower air gap part 92 is closer to the fourth end part 82 of the first winding 8 than the second upper air gap part 91.

As mentioned above, the first support strip assembly of the magnetic element 1*g* in FIG. 8 includes a single support strip or a plurality of support strips. In compare with the magnetic element 1*g* in FIG. 8, the first support strip assembly 7 of the magnetic element 1*h* in this embodiment includes a fourth support strip 71, a fifth support strip 72 and a sixth support strip 73. The fourth support strip 71 is disposed on the magnetic leg 2. In addition, the fourth support strip 71 is arranged between the magnetic leg 2 and the fifth support strip 72. The fifth support strip 72 is disposed on the fourth support strip 71. In addition, the fifth support strip 72 is arranged between the fourth support strip 71 and the sixth support strip 73. The sixth support strip 73 is disposed on the fifth support strip 72. In addition, the sixth support strip 73 is arranged between the fifth support strip 72 and the first winding 8. The first winding 8 is disposed on the sixth support strip 73. The fourth support strip 71 has a top surface 71*a* and a bottom surface 71*b*. The top surface 71*a* and the bottom surface 71*b* are opposed to each other. The fifth support strip 72 has a top surface 72*a* and a bottom surface 72*b*. The top surface 72*a* and the bottom surface 72*b* are opposed to each other. The top surface 72*a* of the fifth support strip 72 is closer to the top surface 71*a* of the fourth support strip 71 than the bottom surface 72*b*. The bottom surface 72*b* of the fifth support strip 72 is closer to the bottom surface 71*b* of the fourth support strip 71 than the top surface 72*a*. Moreover, the sixth support strip 73 has a top surface 73*a* and a bottom surface 73*b*. The top surface 73*a* and the bottom surface 73*b* are opposed to each other. The top surface 73*a* of the sixth support strip 73 is closer to the top surface 71*a* of the fourth support strip 71 and the top surface 72*a* of the fifth support strip 72 than the bottom surface 73*b*. The bottom surface 73*b* of the sixth support strip 73 is closer to the bottom surface 71*b* of the fourth support strip 71 and the bottom surface 72*b* of the fifth support strip 72 than the top surface 73*a*. The top surface 71*a* of the fourth support strip 71 and the top surface 73*a* of the sixth support strip 73 are located at a level higher than the top surface 72*a* of the fifth support strip 72. Consequently, the second upper air gap part 91 is defined by the fourth support strip 71, the top surface 72*a* of the fifth support strip 72 and the sixth support strip 73 collaboratively. A first portion of the second upper air gap part 91 is arranged between the fifth projection line q and the top surface 72*a* of the fifth support strip 72. That is, the first portion of the second upper air gap part 91 is arranged between the fifth projection line q and the sixth projection line r. A second portion of the second upper air gap part 91 is beyond the region between the seventh projection line s and the eighth projection line t through the seventh projection line s. The bottom surface 71*b* of the fourth support strip 71 and the bottom surface 73*b* of the sixth support strip 73 are located at a level lower than the bottom surface 72*b* of the fifth support strip 72. Consequently, the second lower air gap part 92 is defined by the fourth support strip 71, the bottom surface 72*b* of the fifth support strip 72 and the sixth support strip 73 collaboratively. A first portion of the second lower air gap part 92 is arranged between the sixth projection line r and the bottom surface 72*b* of the fifth support strip 72. That is, the first portion of the second lower air gap part 92 is arranged between the fifth projection line q and the sixth projection line r. A second portion of the second lower air gap part 92 is beyond the region between the seventh projection line s and the eighth projection line t through the eighth projection line t.

From the above descriptions, the magnetic element of the present disclosure includes at least one first air gap. A first portion of the first air gap is arranged between the first projection line and the second projection line. A second portion of the first air gap is beyond the region between the third projection line and the fourth projection line through at least one of the third projection line and the fourth projection line. In other words, there are air gaps between the end parts of the winding and the magnetic leg. Consequently, the dielectric constant between the first end part of the winding and the magnetic leg and the dielectric constant between the second end part of the winding and the magnetic leg are reduced. Moreover, the electric field distribution of the first end part and the second end part will be more uniform, and the partial discharge extinction voltage will be increased. In other words, the partial discharge problem is solved. The volume and the cost of the magnetic element are both reduced. In addition, the equalizing rings are not required. Consequently, the fabricating process of the magnetic element of the present disclosure is simplified.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:

a magnetic core comprising a magnetic leg;

at least one support strip assembly disposed on the magnetic leg;

a winding wound around the at least one support strip assembly, and comprising a first end part, a second end part and a first connection part, wherein the first end part and the second end part are respectively connected with two opposite sides of the first connection part, the first end part comprises a first endpoint and a second endpoint, and the second end part comprises a third endpoint and a fourth endpoint, wherein the first endpoint and the second endpoint are connected with each other, the second endpoint is connected with the first connection part, a first projection line is formed between a projection point of the second endpoint on the magnetic leg and the second endpoint, the third endpoint and the fourth endpoint are connected with each other, the fourth endpoint is connected with the first connection part, a second projection line is formed between a projection point of the fourth endpoint on the magnetic leg and the fourth endpoint, a third projection line is formed between a projection point of the first endpoint on the magnetic leg and the first endpoint, and a fourth projection line is formed between a projection point of the third endpoint on the magnetic leg and the third endpoint, wherein a connection line between the first endpoint and the third endpoint is the longest distance of the winding in parallel with an axial direction of the magnetic leg; and at least one first air gap arranged between the magnetic leg and the winding, wherein the at least one first air gap is at least defined by the at least one support strip assembly, wherein a first portion of the at least one first air gap is arranged between the first projection line and the second projection line, and a second portion of the at least one first air gap is beyond a region between the third projection line and the fourth projection line through at least one of the third projection line and the fourth projection line;

wherein each first air gap comprises at least one first upper air gap part and at least one first lower air gap part, and each support strip assembly comprises a single support strip, wherein the at least one first upper air gap part and the at least one first lower air gap part are formed in the support strip, wherein the at least one first upper air gap part is formed in an upper region of the support strip, and the at least one first lower air gap part is formed in a lower region of the support strip, wherein a first portion of the first upper air gap part is arranged between the first projection line and the second projection line, a second portion of the first upper air gap part is beyond a region between the third projection line and the fourth projection line through the third projection line, a first portion of the first lower air gap part is arranged between the first projection line and the second projection line, and a second portion of the first lower air gap part is beyond a region between the third projection line and the fourth projection line through the fourth projection line;

wherein the at least one first upper air gap part is not exposed to a top surface of the support strip, and the at least one first lower air gap part is not exposed to a bottom surface of the support strip.

2. The magnetic element according to claim 1, wherein the at least one first upper air gap part is a concave space that is formed in the upper region of the support strip, and the first upper air gap part has a first depth in parallel with the axial direction of the magnetic leg, wherein the at least one first lower air gap part is another concave space that is formed in the lower region of the support strip, and the first lower air gap part has a second depth in parallel with the axial direction of the magnetic leg, wherein a length between the projection point of the first endpoint on the magnetic leg and the projection point of the second endpoint on the magnetic leg is smaller than the first depth, and a length between projection point of the third endpoint on the magnetic leg and the projection point of the fourth endpoint on the magnetic leg is smaller than the second depth.

3. A magnetic element, comprising:

a magnetic core comprising a magnetic leg;

at least one support strip assembly disposed on the magnetic leg;

a winding wound around the at least one support strip assembly, and comprising a first end part, a second end part and a first connection part, wherein the first end part and the second end part are respectively connected with two opposite sides of the first connection part, the first end part comprises a first endpoint and a second endpoint, and the second end part comprises a third endpoint and a fourth endpoint, wherein the first endpoint and the second endpoint are connected with each other, the second endpoint is connected with the first connection part, a first projection line is formed between a projection point of the second endpoint on the magnetic leg and the second endpoint, the third endpoint and the fourth endpoint are connected with each other, the fourth endpoint is connected with the first connection part, a second projection line is formed between a projection point of the fourth endpoint on the magnetic leg and the fourth endpoint, a third projection line is formed between a projection point of the first endpoint on the magnetic leg and the first endpoint, and a fourth projection line is formed between a projection point of the third endpoint on the magnetic leg and the third endpoint, wherein a connection line between the first endpoint and the third endpoint is the longest distance of the winding in parallel with an axial direction of the magnetic leg; and at least one first air gap arranged between the magnetic leg and the winding, wherein the at least one first air gap is at least defined by the at least one support strip assembly, wherein a first portion of the at least one first air gap is arranged between the first projection line and the second projection line, and a second portion of the at least one first air gap is beyond a region between the third projection line and the fourth projection line through at least one of the third projection line and the fourth projection line;

wherein each support strip assembly comprises two first support strips and a second support strip, wherein the two first support strips are discretely arranged between the magnetic leg and the second support strip, the two first support strips are respectively disposed on two ends of the second support strip, the second support strip is disposed on the two first support strips, the second support strip is arranged between the two first support strips and the winding, and the winding is disposed on the second support strip, wherein the at least one first air gap is defined by the two first support strips, the magnetic leg and the second support strip collaboratively, and the second portion of the at least one first air gap is beyond a region between the third projection line and the fourth projection line through both of the third projection line and the fourth projection line.

4. A magnetic element, comprising:

a magnetic core comprising a magnetic leg;

at least one first support strip assembly disposed on the magnetic leg;

a first winding wound around the at least one first support strip assembly;

at least one second support strip assembly disposed on the first winding;

a second winding wound around the at least one second support strip assembly, and comprising a first end part, a second end part and a first connection part, wherein the first end part and the second end part are respectively connected with two opposite sides of the first connection part, the first end part comprises a first endpoint and a second endpoint, and the second end part comprises a third endpoint and a fourth endpoint, wherein the first endpoint and the second endpoint are connected with each other, the second endpoint is connected with the first connection part, a first projection line is formed between a projection point of the second endpoint on the magnetic leg and the second endpoint, the third endpoint and the fourth endpoint are connected with each other, the fourth endpoint is connected with the first connection part, a second projection line is formed between a projection point of the fourth endpoint on the magnetic leg and the fourth endpoint, a third projection line is formed between a projection point of the first endpoint on the magnetic leg and the first endpoint, and a fourth projection line is formed between a projection point of the third endpoint on the magnetic leg and the third endpoint, wherein a connection line between the first endpoint and the third endpoint is the longest distance of the second winding in parallel with an axial direction of the magnetic leg; and at least one first air gap arranged between the second winding and the first winding, wherein the at least one first air gap is at least defined by the at least one second support strip assembly, wherein a first portion of the at least one first air gap is arranged between the first projection line and the second projection line, and a second portion of the at least one first air gap is beyond a region between the third projection line and the fourth projection line through at least one of the third projection line and the fourth projection line.

5. The magnetic element according to claim 4, wherein the first winding is a low voltage winding, and the second winding is a high voltage winding.

6. The magnetic element according to claim 4, wherein each first air gap comprises a first upper air gap part and a first lower air gap part, and each second support strip assembly comprises a first support strip, a second support strip and a third support strip, wherein the third support strip is disposed on the first winding and arranged between the first support strip and the first winding, the first support strip is disposed on the third support strip and arranged between the second support strip and the third support strip, the second support strip is disposed on the first support strip and arranged between the first support strip and the second winding, the second winding is disposed on the second support strip, wherein a top surface of the third support strip and a top surface of the second support strip are located at a level higher than a top surface of the first support strip, so that the first upper air gap part is defined by the third support strip, the top surface of the first support strip and the second support strip collaboratively, wherein a first portion of the first upper air gap part is arranged between the first projection line and the second projection line, and a second portion of the first upper air gap part is beyond a region between the third projection line and the fourth projection line through the third projection line, wherein a bottom surface of the third support strip and a bottom surface of the second support strip are located at a level lower than a bottom surface of the first support strip, so that the first lower air gap part is defined by the third support strip, the bottom surface of the first support strip and the second support strip collaboratively, wherein a first portion of the first lower air gap part is arranged between the first projection line and the second projection line, and a second portion of the first lower air gap part is beyond a region between the third projection line and the fourth projection line through the fourth projection line.

7. The magnetic element according to claim 4, wherein the first winding comprises a third end part, a fourth end part and a second connection part, wherein the third end part and the fourth end part are respectively connected with two opposite sides of the second connection part, the third end part comprises a fifth endpoint and a sixth endpoint, and the fourth end part comprises a seventh endpoint and an eighth endpoint, wherein the fifth endpoint and the sixth endpoint are connected with each other, the sixth endpoint is connected with the second connection part, a fifth projection line is formed between a projection point of the sixth endpoint on the magnetic leg and the sixth endpoint, the seventh endpoint and the eighth endpoint are connected with each other, the eighth endpoint is connected with the second connection part, a sixth projection line is formed between a projection point of the eighth endpoint on the magnetic leg and the eighth endpoint, a seventh projection line is formed between a projection point of the fifth endpoint on the magnetic leg and the fifth endpoint, and an eighth projection line is formed between a projection point of the seventh endpoint on the magnetic leg and the seventh endpoint, wherein a connection line between the fifth endpoint and the seventh endpoint is the longest distance of the first winding in parallel with an axial direction of the magnetic leg, wherein the magnetic element comprises at least one second air gap, which is arranged between the first winding and the magnetic leg, wherein the at least one second air gap is at least defined by the at least one first support strip assembly, wherein a first portion of the at least one second air gap is arranged between the fifth projection line and the sixth projection line, and a second portion of the at least one second air gap is beyond a region between the seventh projection line and the eighth projection line through at least one of the seventh projection line and the eighth projection line.

8. The magnetic element according to claim 4, wherein each first air gap comprises a first upper air gap part and a first lower air gap part, and each second support strip assembly comprises a single support strip, wherein a first side of the support strip is attached on the first winding, the second winding is disposed on a second side of the support strip, and the first side and the second side of the support strip are opposed to each other, wherein the first upper air gap part is defined by the first winding, a top surface of the support strip and the second winding collaboratively, a first portion of the first upper air gap part is arranged between the first projection line and the second projection line, and a second portion of the first upper air gap part is beyond a region between the third projection line and the fourth projection line through the third projection line, wherein the first lower air gap part is defined by the first winding, a bottom surface of the support strip and the second winding collaboratively, a first portion of the first lower air gap part is arranged between the first projection line and the second projection line, and a second portion of the first lower air gap part is beyond a region between the third projection line and the fourth projection line through the fourth projection line.

9. The magnetic element according to claim 8, wherein a length of the support strip is greater than 80% of a distance between the first endpoint and the third endpoint of the second winding and smaller than the distance between the projection point of the second endpoint of the second winding on the magnetic leg and the projection point of the fourth endpoint on the magnetic leg, and the length of the support strip is in parallel with the axial direction of the magnetic leg.

10. The magnetic element according to claim 4, wherein each first air gap comprises at least one first upper air gap part and at least one first lower air gap part, and each second support strip assembly comprises a single support strip, wherein the at least one first upper air gap part and the at least one first lower air gap part are formed in the support strip, wherein the at least one first upper air gap part is formed in an upper region of the support strip, and the at least one first lower air gap part is formed in a lower region of the support strip, wherein a first portion of the first upper air gap part is arranged between the first projection line and the second projection line, a second portion of the first upper air gap part is beyond a region between the third projection line and the fourth projection line through the third projection line, a first portion of the first lower air gap part is arranged between the first projection line and the second projection line, and a second portion of the first lower air gap part is beyond a region between the third projection line and the fourth projection line through the fourth projection line.

11. The magnetic element according to claim 4, wherein each second support strip assembly comprises a single support strip, and a length of the support strip in parallel with the axial direction of the magnetic leg is greater than or equal to a length between the first endpoint and the third endpoint of the second winding, wherein the at least one first air gap is formed in the support strip, and the at least one first air gap runs through a top surface and a bottom surface of the support strip.

* * * * *